United States Patent Office 2,886,124
Patented May 12, 1959

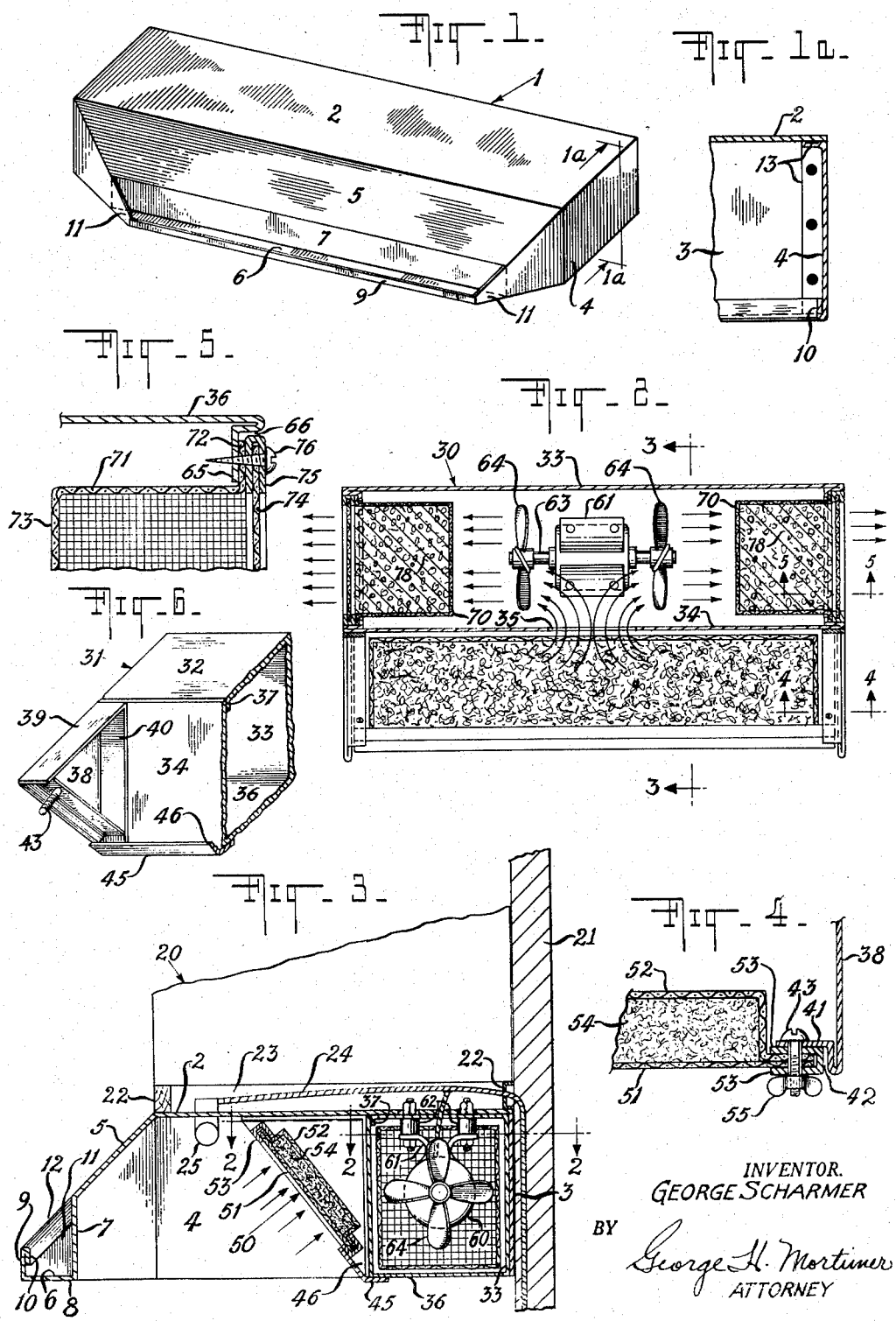

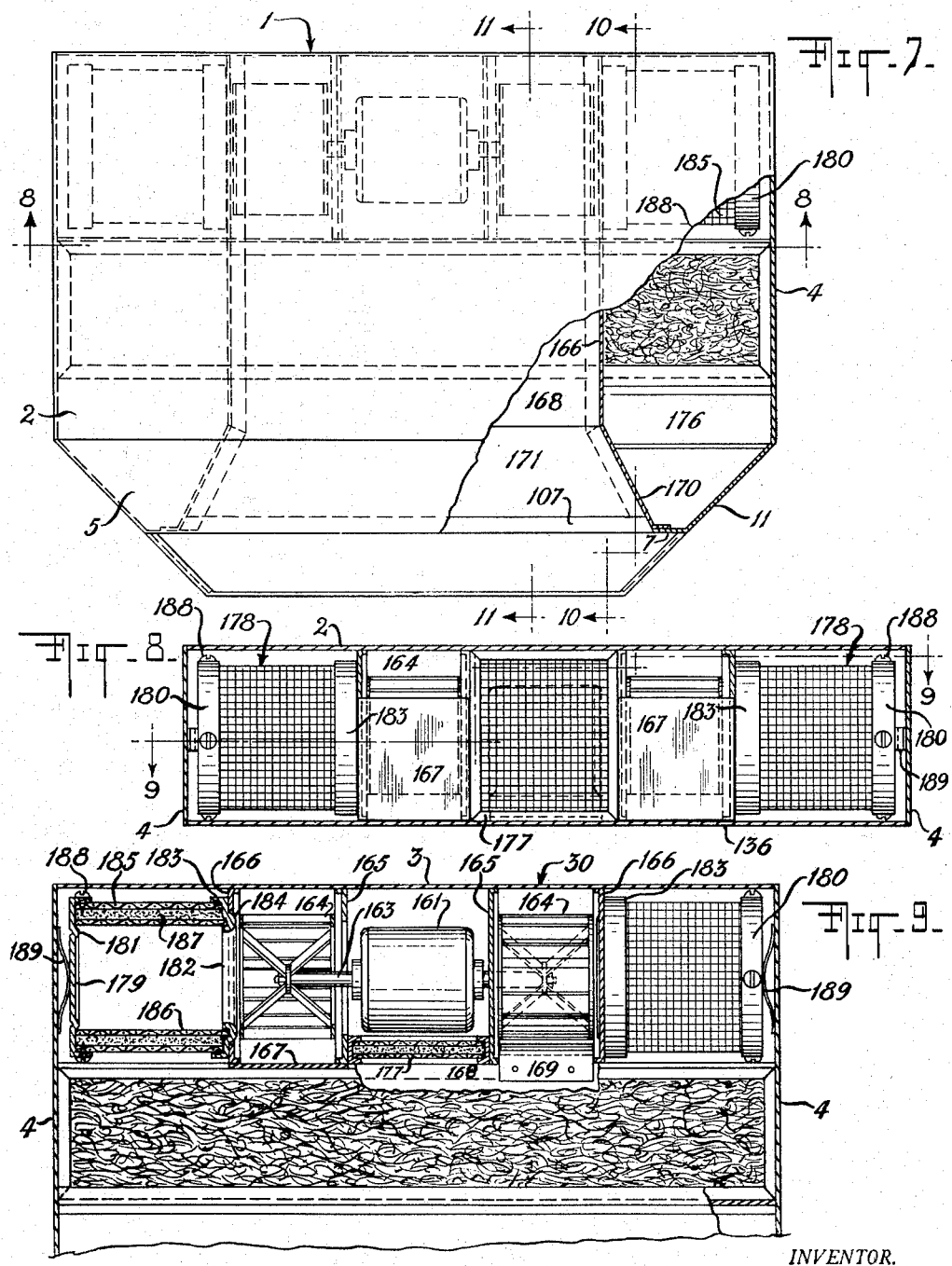

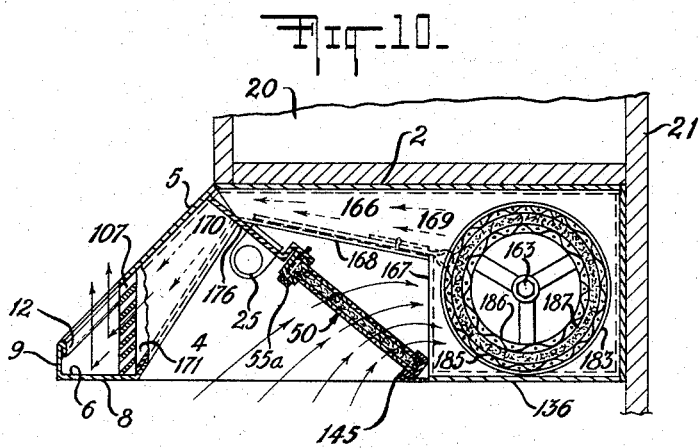
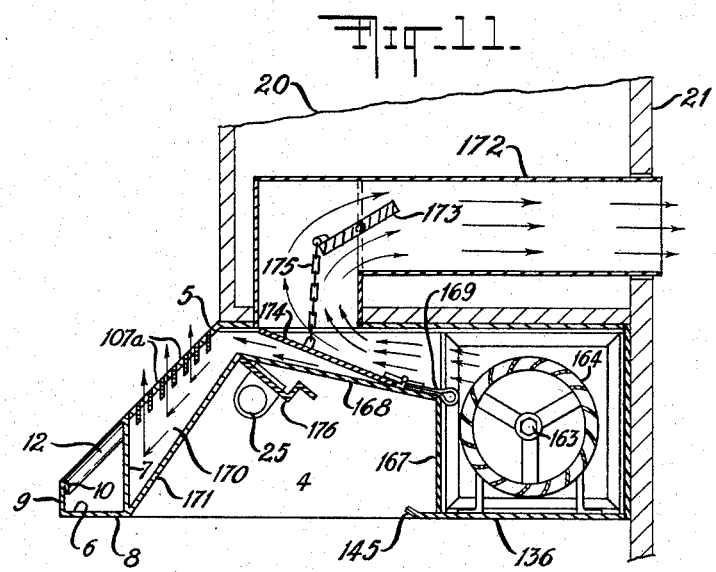

2,886,124

KITCHEN CONDITIONER

George A. Scharmer, Paramus, N.J., assignor, by mesne assignments, to The Duct-Less Hood Co., Inc.

Application July 13, 1956, Serial No. 597,722

22 Claims. (Cl. 183—4.3)

The present invention relates to a kitchen conditioner for use above a kitchen stove, and more particularly, to a conditioner which filters and purifies air so that it can be returned to the kitchen instead of having to be exhausted to the outside atmosphere, although it may be so exhausted, if desired.

The objects, structure and advantages of the invention will be explained in conjunction with the drawing in which:

Fig. 1 is an isometric view of one form of hood which may form one element of the invention;

Fig. 1a is a fragmentary sectional view on the line 1a—1a of Fig. 1 on a somewhat larger scale;

Fig. 2 is a plan view, partly in section, of an air filtering and purifying unit embodying the invention which is removable from the hood and separated therefrom, taken on the line 2—2 of Fig. 3;

Fig. 3 is a vertical sectional view of the same embodiment of the air filtering and purifying unit mounted in the hood of Fig. 1 which is secured beneath a cabinet shown fragmentarily, the unit being along the line 3—3 of Fig. 2;

Fig. 4 is a fragmentary detail sectional view of the air filter and housing on the line 4—4 of Fig. 2;

Fig. 5 is a fragmentary sectional view of the air purifying canister and housing on the line 5—5 of Fig. 2;

Fig. 6 is a fragmentary isometric view of an end of the housing of the same embodiment;

Fig. 7 is a plan view, partly broken away to reveal details of construction, of a second, and preferred, embodiment of the invention;

Fig. 8 is a vertical sectional view along the line 8—8 of Fig. 7;

Fig. 9 is a horizontal sectional view along the line 9—9 of Fig. 8;

Fig. 10 is a cross-sectional view along the line 10—10 of Fig. 7 showing, in a manner analogous to Fig. 3, the preferred embodiment installed beneath a kitchen cabinet; and Fig. 11 is a cross-sectional view of a third embodiment of the invention, taken through the portion corresponding to line 11—11 of Fig. 7.

In the various embodiments the corresponding parts bear the same reference numbers.

Referring to Figs. 1 and 3, the hood 1 comprises a flat top wall 2 which is horizontal when installed, a back wall 3 and two end walls 4 at right angles to the top and which depend vertically therefrom when installed, a front wall 5 projecting forwardly and downwardly when installed, e.g., on a curve, either convex or concave, or straight at an obtuse angle to the top 2. The downwardly sloping wall 5 may have an upwardly opening U-shaped trough-like groove or shelf 6 formed therein by a vertical wall 7, a horizontal wall 8 and a vertical wall 9 spaced from wall 7. Wall 9 is preferably reversely bent at 10 to provide a blunt reinforcing edge or hem, and a vertical wall 11 connects the front ends of the end walls 4 with the front wall 5 at an obtuse angle to said vertical walls 7 and 9 and to said end walls 4, a portion of the wall 11 forming a stop at the end of groove 6 where blunt reinforcing edges or hems 12 are also formed on wall 11. All contiguous corners are joined together securely, being either integral or having a tongue 13 on one wall underlying and spot welded to the adjacent wall, as shown in Fig. 1a. Reference to Figs. 1 and 3 shows that the vertical portion 7 of the wall 5 terminates at its lower edge in the plane of the lower edges of the vertical end walls 4 and 11.

The hood 1 is intended for installation above a kitchen range, which may be coal, oil, gas or electric, and preferably just beneath a kitchen cabinet to which the hood may be secured. Such a cabinet is shown fragmentarily at 20 in Fig. 3, Fig. 10 and Fig. 11 against the wall 21 of the kitchen. It will be seen that the flat horizontal top wall of the hood is adapted to engage the underside of the kitchen cabinet and that the wall 5 is adapted to project forwardly and downwardly from the front of the kitchen cabinet into free contact with the air in the kitchen. The cabinet may be of any desired construction of wood, metal and the like. Spacers 22, either part of the cabinet structure or separate strips fastened on the bottom of the cabinet, may be used to provide a space 23 for concealed electric wiring 24 to an electric light 25, and an electric motor later to be described, when the hood is secured to the spacers 22. Individual switches for the light and motor (not shown) may be provided at any convenient position within the hood or elsewhere.

In the position illustrated the shelf 6 forms a convenient place to hold condiments, an open cook book, recipe cards and the like which are used in culinary work at the stove or adjacent thereto.

The hood forms an element in the combination with an air conditioning means which may be a separate unit 30, as in Figs. 2 to 6, or may be built into the hood as shown in Figs. 7 to 11. In any case the air conditioning means comprises a housing having an inlet opening under the hood and a discharge or outlet opening into the kitchen, means in the housing for causing air to flow into the inlet opening and out of the outlet opening, and means to remove foreign particles from the air flowing through the air conditioning means.

In the embodiment shown in Figs. 2 to 6, the unit 30 comprises an open ended tubular housing 31 having a top wall 32, a back wall 33, a front wall 34 having a central air inlet opening 35 and a bottom wall 36 preferably made from a single sheet of metal of suitable gauge with a short flange on one end underlying and spot welded to the other end as seen at 37 in Figs. 3 and 6. At each end of the front wall 34 is secured a right triangular bracket 38 having a flange 39 on its base aligned with the top wall 32 and its apex aligned with the bottom wall 36 by means of a flange 40 spot welded to the front wall 34 as seen in Fig. 6. Along the hypotenuse the metal edge 41 is bent back on itself and then at right angles to form a rabbet 42 for a purpose to be described, the edge 41 forming a flange through a suitable opening in which a bolt 43 is passed and preferably secured therein, e.g., by soldering the head to the surrounding metal.

An angle strip 45 is secured, e.g., by spot welding, along the front edge of the bottom wall 36 between the two end brackets 38 forming a channel 46 for a purpose to be described later. The free edge of strip 45 is substantially aligned with the hypotenuse of angle brackets 38.

The means for removing foreign particles from the air flowing through the air conditioner comprises a grease filter 50 and preferably also air purifying or deodorizing means 70.

The grease filter 50 comprises a front wall 51, a rear wall 52 in the shape of a shallow pan and a channel strip 53 surrounding the periphery of the filter holding the edges of the front and back walls securely together. The walls 51 and 52 are made of pervious material, e.g., metallic filter cloth, woven wire mesh, or the like and the space between them is filled with filter material such as metal wool, plastic fibre, or the like. The thickness of the channel strip 53 and the enclosed edges of walls 51 and 52 substantially correspond to the depth of rabbet 42, the length of the filter substantially corresponds to the distance between the triangular brackets 38 and the width to the hypotenuse thereof so that the filter forms a practically air tight seal with the angle strip 45, the brackets 38 and the top wall 2 of the hood when the parts are assembled as shown in Figs. 3 and 4. The channel strip 53 is apertured at positions aligned with the bolts 43 and the filter 50 is removably held in position by the thumbnuts 55.

A motor 60 is mounted centrally in the tubular housing in any suitable way but preferably on the under side of the top wall 32 by means of a bracket 61 on the motor and vibration damping bolts 62 secured to the brackets and the top wall 22 as seen in Fig. 3. Being centrally located the motor is directly in the path of air flowing inwardly through opening 35. This is an important feature because the air serves to cool the motor while it is operating. The motor is provided with a shaft extending beyond both ends of the casing of the motor and a fan or blower 64 is fixed to each end. The blades of the fans or blowers are so shaped that when the shaft rotates air is forced by each fan or blower outwardly toward the outlet of the housing 31 closest to it, as shown by the arrows in Fig. 2. The motor is connected to a source of electric power by the wiring 24 as previously described.

The metal surrounding the outlets of the housing 31 is bent back on itself and then at right angles to form a flange 65 and a rabbet 66, as shown in Figs. 2 and 5, for removably receiving an air purifying unit 70 now to be described.

The air purifying unit or canister 70 provided for each outlet of housing 31 preferably comprises a wire basket of approximately cubical shape having an open end, four sides 71, each with an outwardly turned flange 72 at the open end, and an end wall 73 (Fig. 5). Over the open end a removable wire cover 74 having a channel frame 75 surrounding it is removably held, e.g., by two or more metal screws 76 which may also secure the purifying unit in the rabbet 66 as shown in Fig. 5. The basket is filled with adsorbent material 78 capable of adsorbing kitchen odors, e.g., charcoal, activated carbon, or the like.

The unit 30 is preferably mounted in a hood 1 as shown in Fig. 3 with the back wall 33 of the unit against the back wall 3 of the hood and the top wall 32 and bracket flanges 39 against the top wall 2 of the hood and it may be held there by spot welding, metal screws, bolts, or the like, as desired. The unit is preferably shorter than the hood so that air leaving the unit outwardly as shown by the end arrows in Fig. 2 can flow readily but this is not essential since the invention contemplates other embodiments of the same principle, e.g., a housing like 31 closed at the ends and provided with outlet openings in the bottom wall 36 near its ends corresponding to the openings in the ends of the housing shown. Each of these openings in the bottom wall can be constructed to receive a purifying unit 70, or a purifying unit can be placed in the space between the filter 50 and the inlet opening 35, without changing the principle of the invention, e.g., in a manner analogous to filter 177 in Figs. 8 and 9, as described later. Other means for venting the air to the kitchen and/or the atmosphere outside the kitchen are shown in Figs. 10 and 11. The invention also contemplates providing a wall connecting the flanges 39 if the top wall of a hood does not serve to close this area. It will thus be seen that the unit 30 may be used alone or in hoods of any design, although it is preferred to provide the hood 1 and the unit 30 in combination.

In the operation of the combination when installed over a kitchen stove, the housewife turns on the motor 60 when she begins to cook. This creates a negative pressure in the space behind the filter 50 which causes fumes rising from the stove to flow through the filter, giving up any grease entrained therein to the filter where it is held until washed therefrom, as it may be periodically as required, by simply loosening thumbnuts 55, removing the filter and washing it in hot water, grease solvent, or the like. The degreased air then streams into the housing 31 through opening 35, cooling the motor as it passes over it, and then is forced by the fans 64 through the purifying units where odors and the like are adsorbed and removed so that the air leaving the unit is free from grease and impurities. This is accomplished without the expense of connecting the unit to an outside flue, without loss of heat which is expensive in cold weather, and without increasing the heat content of the air noticeably which would be undesirable in hot weather.

The purifying units 70 can be readily removed by loosening screws 76 for reactivating or replacing the adsorbent material when it ceases to function effectively.

When the hood of Figs. 2 to 6 is installed over certain types of gas stoves having pilot flames for top burners, the breeze caused by operation of the conditioner which has a downward component as it leaves the hood may extinguish these pilot flames. The two embodiments of the invention illustrated in Figs. 7 to 10 and Fig. 11, respectively, avoid this difficulty by imparting to the air an upward and/or outward component rather than a downward one.

Referring now to Figs. 7 to 10, the hood 1 is essentially the same in general construction as already described but differs in that the wall 7 instead of being an imperforate wall is provided with a discharge opening or openings, e.g., a louvre 107 for a purpose to be described.

The hood is provided with a bottom wall 136 extending forwardly from the back wall of the hood a distance approximately equal to the height of the back wall and along its front edge there is an angle bend or strip 145 which serves essentially the same function as angle strip 45 in Figs. 2 to 6.

Mounted centrally on the bottom wall 136 is a motor 161 having a shaft 163 extending outwardly at each end beyond the motor housing or casing. On each shaft end is mounted a blower 164, e.g., of the centrifugal wheel or cage type. Between the motor and each wheel a rectangular wall 165 is suitably secured in the hood. The wall has an opening in it through which the motor can pass. At the other side of the wheel a wall 166 is suitably secured in the hood. This wall is generally rectangular with a truncated right triangular extension at the upper front edge, as seen in Fig. 10. In the rectangular portion the wall 166 has an opening large enough to pass the wheel 164.

Secured to the aligned front edges of each pair of walls 165 and 166 is a front wall 167 extending from the bottom wall 136 to a level about half way between a horizontal plane through the shaft 163 and a horizontal plane tangent to the upper periphery of the wheel 164 where the upper and outer corner of front wall 167 meets the juncture of the truncated right triangular extension of wall 166 with the rectangular portion thereof, as best seen in Figs. 10 and 11. It will be seen that the motor 161 and wheels 164 are thus mounted in a housing which is built into the hood rather than being removable therefrom as in the embodiment of Figs. 2 to 6 but which is structurally similar in that the rear portion of the top wall of the hood corresponds to the top wall 32, the back wall of the hood to the back wall 33, bottom wall 136 to bottom wall 36, front walls 167 to front wall 34 and the opening between walls 167 to opening 35.

Suitably secured to and extending between the lower edges of said triangular extensions is a transverse partition or plate 168 which forms the lower wall of an air outlet duct whose side walls are said triangular extensions and whose top wall is the top 2 of the hood. It will be seen that the air outlet duct extends forwardly from about the vertical plane of the front edge of the bottom wall under a central portion of the top wall. An air cut-off 169, formed from a strip of metal bent to U-shape around a mandrel and of a length corresponding approximately to the length of wheel 164, is secured to the plate 168 at its rear edge in front of each wheel 164 so that the cylindrical portion lies adjacent to the respective wheel. From the front ends of the extensions of walls 166 and the front edge of plate 168 the air outlet duct continues by means of end plates 170 flaring outwardly, as seen in Fig. 7, bottom plate 171 and front wall 5 of the hood. The parts including the extensions of walls 166, the transverse partition 168, the end plates 170 and the bottom plate 171 also form with the end walls 4 of the hood an air inlet duct opening to the atmosphere below the hood above the stove. Air drawn into the inlet duct by the blowers 164 and associated parts is forced to flow through the outlet duct and to exit to the kitchen atmosphere either through louvre 107 in wall 7, as seen in Figs. 7 and 10, or through similar louvre openings 107a in front wall 5, as seen in Fig. 11. In either case the outwardly flowing air stream is preferably given an upward component as shown by the arrows so that pilot flames of a stove below are not disturbed by the air flow from the device.

Fig. 11 shows how the air can be diverted to the atmosphere outside the kitchen by providing an exit duct 172, a damper 173 therein which opens and closes the passage of duct 172 and a damper 174 hinged to plate 168 near its rear edge and adapted to be lifted by a connector 175 between the two dampers when damper 173 is opened. The damper 173 can be provided with any suitable manual control to effect its opening, closing and retention in any position of adjustment, thereby directing air flowing from the conditioner into a selected one of the outlets or partially into each. Analogous means for venting air from the other embodiments of the invention may also be provided if desired.

Extending the full distance between end walls of the hood is an upper filter mounting strip 176 which closes the space between the filter 50, the transverse partition or plate 168 and the portions of front wall 5 beyond the duct on either side. The filter is held in position by one or more threaded members 55a. Since the filter 50, the strip 145 and the strip 176 close the opening formed by the front edge of the bottom wall 136, the end walls 4, the air outlet duct and the top wall 2, all air entering the conditioning unit has to flow through filter 50. In so doing it is stripped of grease particles.

Deodorizing or purifying of the air which has passed through filter 50 is accomplished by air purifying means located between filter 50 and the wheels 164, e.g., a single unit similar in size and construction to filter 50 filled with adsorbent material, or three units 177 and 178. The one designated 177 fills and is removably held by any suitable means in the space between walls 165 in front of the motor 161, as seen in Figs. 8 and 9. Its construction is similar to filter 50 except that it is filled with activated carbon or similar adsorbent material. The other units 178 are identical to each other and one is located in each space between a wall 166 and a wall 4.

The purifying unit 178 comprises a solid end disc 179 having a rim flange 180 and a circular ridge 181 (Fig. 9), an annular end disc 182 having a rim flange 183 and a circular ridge 184 which just fits into the opening in wall 166, a porous outer cylinder 185 spot welded to flange 183, an inner porous cylinder 186 spaced and held from the outer cylinder by ridges 181 and 184, a packing 187 of activated carbon or other adsorbent and a plurality of metal screws 188 securing the end disc 179 to outer cylinder 185. A leaf spring 189 holds the unit 178 in place against wall 166 but permits removal of the entire unit from the hood by depressing the leaf spring 189 far enough to clear ridge 184 of wall 166.

The operation of the embodiments of the invention depicted in Figs. 7 to 10 and Fig. 11, respectively, is similar to that described above for the embodiment of Figs. 2 to 6. Thus the motor 161 is turned on by the housewife when she begins to cook which creates a negative pressure in the space behind filter 50 except within the two housings for wheels 164 and the air outlet duct. Air flowing inwardly through filter 50 divides into three streams, one flowing through purifying unit 177 over the motor 161 and into the housings for the wheels 164 through the openings in walls 165, and the other two flowing through units 178 and into the housings for the wheels 164 through annular rings 182 and the openings in walls 166. The air is forced by the rotation of wheels 164 out over cut-off 169 and into the air duct. In the embodiment of Figs. 7 to 10 the air flows from the duct into the room through the louvre 107 into the trough or channel 6 where the lower wall 8 and front wall 9 give it an upward component. In the embodiment of Fig. 11 the housewife has the choice of diverting the air from the air duct out of the kitchen into the outside atmosphere by setting the damper 173 in the open position shown, or of returning it to the kitchen by closing this damper, in which case the air flows from the duct through hte louvre openings 107a with outward and upward components. The deodorizing or purifying units 177 and 178 can be removed for restoring the activity of the deodorizing material or renewing it, as desired, and filter 50 can be cleaned as already described.

This application is a continuation-in-part of my earlier application Serial No. 516,297, filed June 17, 1955, now abandoned.

While there has been described and illustrated what are now deemed to be the best embodiments of the principle of the invention, it is obvious that many changes may be made in details without departing from the principle of the invention as defined in the appended claims.

Having thus described and illustrated the invention, what is claimed is:

1. A kitchen conditioner comprising a hood having a flat elongated rectangular top adapted to be secured directly under a kitchen cabinet above a stove, means forming a housing in said hood having an air inlet opening under the hood, an electric motor mounted in said housing adjacent to said inlet opening, means in said housing operatively connected to said motor for creating a negative pressure at said inlet opening whereby air is caused to flow through said inlet opening and over said motor, a filter removably mounted in said hood upstream from said inlet opening for removing grease particles from air passing through it into said inlet opening, and said housing having an outlet below said top downstream from said inlet opening for returning air to the kitchen without passing through said top.

2. A kitchen conditioner as set forth in claim 1 in which air purifying means separate from said filter are removably located in the path of the filtered air flow in said conditioner.

3. A kitchen conditioner as set forth in claim 2 in which said air purifying means are separately removably located in said outlet.

4. A kitchen conditioner as set forth in claim 2 in which said air purifying means are located between the filter and the means for creating negative pressure.

5. A kitchen conditioner comprising a hood having a flat top adapted to be secured directly under a kitchen cabinet, means forming an elongated housing at the rear of said hood having a lateral inlet opening, a removable washable grease filter mounted in said hood upstream from said inlet opening through which air entering said inlet from a kitchen passes for removal of entrained grease particles, means in said housing for causing air to flow into it through said inlet opening and for imparting horizontal movement to such air, an outlet opening in said housing for passing the horizontally moving air from said housing below said top back into the kitchen without passing through said top, and a removable air purifier containing adsorbent means for deodorizing filtered air mounted in said hood between the filter and the outlet opening.

6. A conditioning unit comprising an elongated tubular housing having an inlet opening intermediate its ends and end outlet openings, a motor having a shaft extending beyond each end of its casing mounted in said tubular housing, means secured to each end of the shaft adapted when driven by said motor to force air to flow toward said outlet openings, means on said housing for removably mounting a filter in front of said inlet opening, and means on said housing for removably mounting pervious canisters containing adsorbent material in said outlet openings.

7. A conditioning unit comprising a tubular housing of rectangular cross section having top, bottom, back and front walls adapted to be secured in a flat-topped hood over a kitchen stove, said housing having a central air inlet opening in said front wall and end outlet openings, a motor having a shaft extending beyond each end of the motor casing, means fixed to each end of the shaft for forcing air to flow into the housing through said inlet, over said motor and out said outlet openings, means for removably securing a grease filter in the path of the air flowing into said inlet opening and means for securing air purifying units in the path of the filtered air flowing through said housing.

8. A conditioning unit comprising a tubular housing of rectangular cross section having top, bottom, back and front walls adapted to be secured in a flat-topped hood over a kitchen stove, said housing having a central air inlet opening in said front wall and end outlet openings, a motor having a shaft extending beyond each end of the motor casing, a fan fixed to each end of the shaft for forcing air to flow into the housing through said inlet, over said motor and out said outlet openings, a right triangular end piece secured to and extending outwardly from said front wall at each end with its base aligned with the top wall and its apex aligned with the bottom wall of the housing, a flange on the hypotenuse of each triangular end piece directed toward the other end piece, a filter removably secured to the flanges, and means for securing air purifying means in the path of the filtered air flowing through said housing.

9. A conditioning unit as set forth in claim 8 in which said filter comprises metal cloth front and back walls, a filler of metal wool and a channel frame receiving and holding the edges of said metal cloth walls, and said housing has a strip secured to the front edge of said bottom wall forming a channel extending the full distance between said end pieces receiving the lower edge of said filter.

10. A kitchen conditioner comprising a hood having a flat top wall, end walls at right angles to said top wall, and a downwardly sloping front wall having an outlet opening leading to the kitchen, means having an inlet opening mounted in said hood for drawing air from under said hood through said inlet opening and discharging it through the outlet opening in said front wall into the kitchen, a removable grease filter upstream from said inlet opening and a removable air purifier between said filter and said outlet comprising adsorbent means for deodorizing filtered air.

11. A kitchen conditioner comprising a hood having a flat top, end walls at right angles to said top and a downwardly sloping front wall having an air outlet opening therein leading to the kitchen, means forming a housing in said hood having an air inlet opening and a duct leading to said outlet opening, a grease filter removably mounted in said hood upstream from said inlet opening whereby air flowing into the housing through said inlet opening flows first through said filter, means in said housing for creating a negative pressure at said filter and a positive pressure at said outlet opening, and means between said filter and said outlet opening for adsorbing odors from air passing through said filter and out of said outlet opening into the kitchen.

12. A kitchen conditioner comprising a hood having top, back and end walls and a partial bottom wall extending forwardly from said back wall a distance approximately equal to the height of said back wall; an air duct extending forwardly from about the vertical plane of the front edge of said bottom wall under a central portion of said top wall; means for mounting a grease filter so as to close the opening formed by the front edge of the bottom wall, the end walls, the air duct and the top wall; a motor having shaft extensions beyond its casing at each end mounted centrally on said bottom wall; a centrifugal wheel mounted on each end of said shaft; means forming a housing for each wheel communicating with the back end of said air duct and having air inlets at each end of said wheel; air purifying means mounted in the path of air flowing through said filter and into said air inlets; and means for venting air from said duct with an upward component.

13. A kitchen conditioner as set forth in claim 12 in which said hood comprises a downwardly sloping front wall having an upwardly opening U-shaped groove along the front edge thereof and said air venting means includes a louvre directing air into said groove.

14. A kitchen conditioner as set forth in claim 12 in which said hood comprises a downwardly sloping front wall having a louvre formed therein and said air duct conducts air to said louvre.

15. A kitchen conditioner as set forth in claim 12 in which said means for venting air from said duct includes a duct adapted to communicate with the atmosphere outside the kitchen.

16. A kitchen conditioner as set forth in claim 12 in which said means for venting air from said duct includes both a duct adapted to communicate with the atmosphere outside the kitchen and a duct adapted to communicate with the atmosphere inside the kitchen and damper means for selectively directing air from said conditioner into a selected one of said last named ducts or partially into each.

17. A kitchen conditioner as set forth in claim 12 in which said air purifying means includes a rectangular unit filling the space between the bottom wall, the top wall and the housing means for the wheels in front of the motor and two cylindrical units axially aligned with the wheels, all of said units being removable.

18. A kitchen conditioner comprising a hood having a top, end walls at right angles to the top, a forwardly and downwardly projecting front wall having an air outlet opening, means forming a housing under said hood having an air inlet opening, a grease filter removably mounted in said hood upstream of said opening, means for creating a negative air pressure behind said filter, means adapted for venting filtered air from said housing through said outlet opening to the atmosphere inside a kitchen in which the hood is installed, a duct communicating with said venting means and the atmosphere outside the kitchen, damper means for controlling the flow of air through said venting means either through said outlet opening or out of said duct, and separately removable means in said hood for adsorbing odors from said filtered air.

19. A kitchen conditioner comprising an open bottom hood adapted to be mounted above a cooking stove, said hood having a vertical back wall, a vertical front wall, end walls, a horizontal top wall and a sloping wall extending downwardly from the front edge of the horizontal top wall to the upper edge of the vertical front wall, an elongated member mounted on and forming with said hood an elongated housing, said housing having an air outlet in an end wall for returning air to the kitchen and an air inlet in a side wall thereof remote from said outlet, a motor and blower mounted in said housing for creating a negative pressure at said inlet and under said hood with which said housing communicates through said inlet, and for creating a positive pressure at said outlet, and a plurality of air filtering and purifying means removably mounted in the path of air flowing into the hood and out of the outlet, whereby fumes rising from the stove will be caused to enter the hood through the open bottom thereof and will be forced with air by the pressure differential created by the blower through the inlet, through the filtering and purifying means for separating grease and foreign matter therefrom before the purified air is expelled by said blower through said outlet into the kitchen.

20. A kitchen hood comprising a flat horizontal top wall adapted to engage the underside of a kitchen cabinet above a stove, a wall projecting forwardly and downwardly from the front edge of said top wall in free contact with the air in the kitchen and having an air discharge opening therein, and vertical end walls secured to said top wall and to said forwardly and downwardly projecting wall, said forwardly and downwardly projecting wall terminating at the lower edge thereof in the plane of the lower edge of said end walls; and air conditioning means located in said hood having an air inlet under said hood, a motor driven means for drawing air in through said air inlet and forcing it out through said discharge opening into the kitchen, and means for removing foreign particles from the air as it passes through said air conditioning means.

21. A kitchen hood as set forth in claim 20 in which said means for removing foreign particles from the air comprises both air filtering means having a washable grease filter for first removing entrained grease particles from the air and air purifying means including activated carbon for removing odors from the filtered air.

22. A kitchen hood comprising a flat, horizontal top wall adapted to engage the underside of a kitchen cabinet above a stove, a wall adapted to project forwardly and downwardly from the lower front edge of the kitchen cabinet into free contact with the air in the kitchen and having an air discharge opening therein, vertical end walls secured to said top wall and to said forwardly and downwardly projecting wall, means including a transverse partition in said hood forming an air inlet duct opening to the atmosphere below said hood over the stove and an air outlet duct leading to said discharge opening, a motor and blower mounted in said hood to create a negative pressure in said inlet duct and a positive pressure in said outlet duct to cause kitchen air to flow into said inlet opening below said hood and from said discharge opening back into the kitchen, and means in said inlet duct for removing foreign particles from the air as it flows therethrough.

References Cited in the file of this patent

UNITED STATES PATENTS

| | | |
|---|---|---|
| 1,205,412 | Tideman | Nov. 21, 1916 |
| 1,847,233 | Bilde | Mar. 1, 1932 |
| 1,954,924 | Engberg et al. | Apr. 17, 1934 |
| 2,213,017 | Perkins | Aug. 27, 1940 |
| 2,369,375 | Sonntag | Feb. 13, 1945 |
| 2,392,038 | Gaylord | Jan. 1, 1946 |
| 2,535,707 | Vezey | Dec. 26, 1950 |
| 2,584,613 | Pledger | Feb. 5, 1952 |
| 2,596,874 | Sonntag | May 13, 1952 |
| 2,621,755 | Gray | Dec. 16, 1952 |
| 2,671,528 | Gross | Mar. 9, 1954 |
| 2,794,514 | Risley | June 4, 1957 |